United States Patent [19]

Knights

[11] Patent Number: 4,796,938

[45] Date of Patent: Jan. 10, 1989

[54] GARDEN SCOOP

[76] Inventor: Douglas Knights, Route 1, Box 291, Sandwich, Ill. 60458

[21] Appl. No.: 124,816

[22] Filed: Nov. 24, 1987

Related U.S. Application Data

[63] Continuation-in-part of Ser. No. 907,119, Sep. 12, 1986, abandoned.

[51] Int. Cl.[4] .......................... A47F 13/08; B65F 1/06
[52] U.S. Cl. .................................. 294/55; 294/1.1
[58] Field of Search ............ 294/55, 9, 10, 50.9, 294/49, 53.5, 50.8, 1.1, 57, 19.1; 15/257.1, 257.2, 257.5, 257.6, 257.7; 126/244, 243; 220/17, 2, 260, 262, 263, 270, 334; 209/417, 418; 110/166

[56] References Cited

U.S. PATENT DOCUMENTS

| | | | |
|---|---|---|---|
| 304,362 | 9/1884 | Seavey | 294/55 |
| 364,313 | 6/1887 | Skillin | 294/55 |
| 784,562 | 3/1905 | Hetland | 294/55 |
| 3,026,138 | 3/1962 | Benjamin et al. | 294/55 |
| 4,361,245 | 11/1982 | Allen et al. | 294/55 |

*Primary Examiner*—James B. Marbert
*Attorney, Agent, or Firm*—Tilton, Fallon, Lungmus & Chestnut

[57] ABSTRACT

A novel scoop for use in a garden or lawn for loading and transporting dirt, trash, leaves, weeds, and the like. The scoop has a detachable gate for easing the loading of material into the scoop and for dumping material from the scoop. The scoop comprises a flat rectangular bottom having an upstanding back wall with opposite side walls having a sloping front engaging the detachable gate. Handles are placed on the back wall, gate, and in a position engaging both side walls.

8 Claims, 1 Drawing Sheet

GARDEN SCOOP

This application is a continuation-in-part application of U.S. Ser. No. 907,119, filed Sept. 12, 1986, now abandoned.

BACKGROUND AND SUMMARY OF THE INVENTION

While working in the lawn or garden, it is convenient to have a container for holding vegetables, weeds, twigs, dirt, etc. It would be even more convenient to have a container with a detachable wall to serve as a scoop for transporting materials. For example, when a hole is dug for planting a bush, the dirt removed from the ground could be placed in a container. After the bush is placed into the ground a wall from the container could be removed and the dirt poured through the opening in the container into the hole and around the bush for planting the bush into the ground.

A review of the prior art does not suggest a garden scoop with a detachably mounted gate as described in the present invention.

U.S. Pat. No. 4,402,538 discloses a shovel for removing ashes from a pit that has a scoop portion and a hinged lid thereon. The scoop portion has a bottom wall with an upturned loop, side and rear walls and an open front. The lid portion has a downwardly depending extension for overlying the open front of the scoop when the lid is in its closed position.

U.S. Pat. No. 4,299,419 discloses a fireplace ash cleaning shovel comprising a flat rectangular bottom, an upstanding back wall, opposite side walls having a sloping front opposite the back walls, and a front gate and affixed handle mounted on the back wall.

U.S. Pat. No. 4,128,912 discloses a garden tray having means by which it could be supported from the ground at an angle for easily scraping material onto the tray.

U.S. Pat. No. 2,544,014 discloses a dust pan having an open side with its lower edge defining a scraping edge and a hinged cover normally closing the open side of the dust pan. U.S. Pat. No. 926,927 discloses a dust pan having a spring steel lip extending downwardly to engage the floor from an elevated portion formed at the mouth of the dustpan. The spring steel lip normally bearing against the floor so as to scrape up any material to be gathered and easily swept into the body of the pan.

U.S. Pat. No. 784,562 discloses a grain scoop having handles mounted on the side walls.

U.S. Pat. No. 502,296 discloses a dust pan with a folding handle.

U.S. Pat. No. 346,313 discloses a grain scoop having a handle pivotably attached to the side walls and guided by arc brackets.

U.S. Pat. No. 285,877 discloses another form of a dust pan in combination with a handle for adapting the position of the dust pan for receiving material swept into it.

U.S. Pat. No. D50,123 discloses a dust pan having a handle at its back end with a carrying loop extending from side to side of the pan, the rear end of the pan being somewhat enclosed so that the material swept or scraped up into the pan could be held in the enclosed part of the pan at its rearward end.

The present invention is directed to a garden scoop having a flat rectangular bottom, and upstanding back wall, opposite side walls having a sloping front opposite the back wall and a front gate between the side walls and adjacent to the bottom detachably mounted and a handle mounted on the side walls adapted for carrying the scoop.

An object of the present invention is to provide a novel scoop that is designed particularly for use out-of-doors when working on a lawn or in a garden and which serves for picking up or transporting trash, clippings, leaves, twigs, firewood, pulled-out weeds, or vegetables.

Another object of the present invention is to provide a garden scoop with a detachable gate, which when removed, provides for the easing of the loading of material into the scoop and for dumping of the material from the scoop.

Other objects are to provide a garden scoop which is simple in design, inexpensive to manufacture, rugged in construction, easy to use and efficient in operation.

These and other objects will be readily evident upon a study of the following specification and the accompanying drawing wherein.

DESCRIPTION OF PREFERRED EMBODIMENTS

Figure 1:
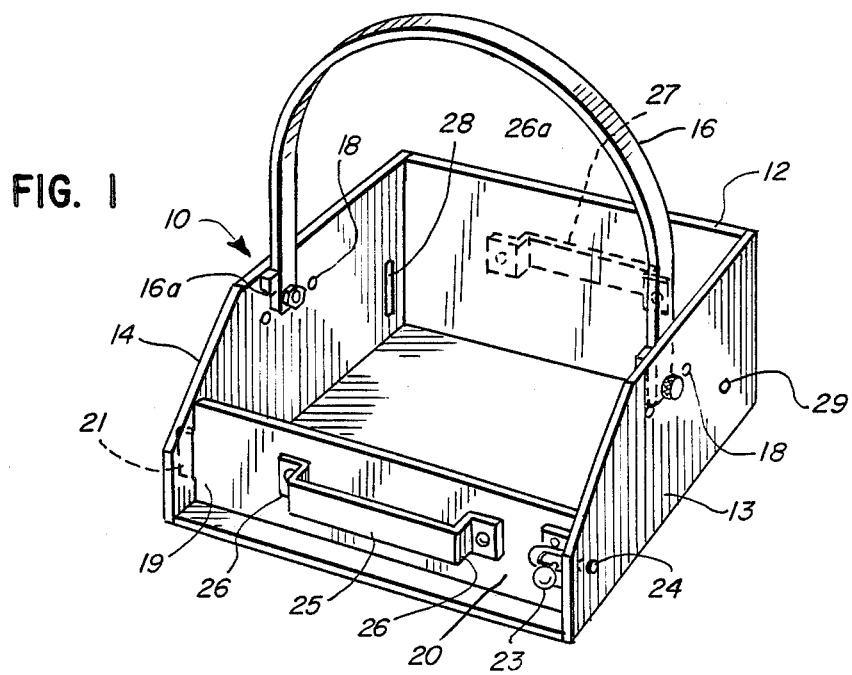
FIG. 1 is a top perspective view of the scoop of the invention.
Figure 2:
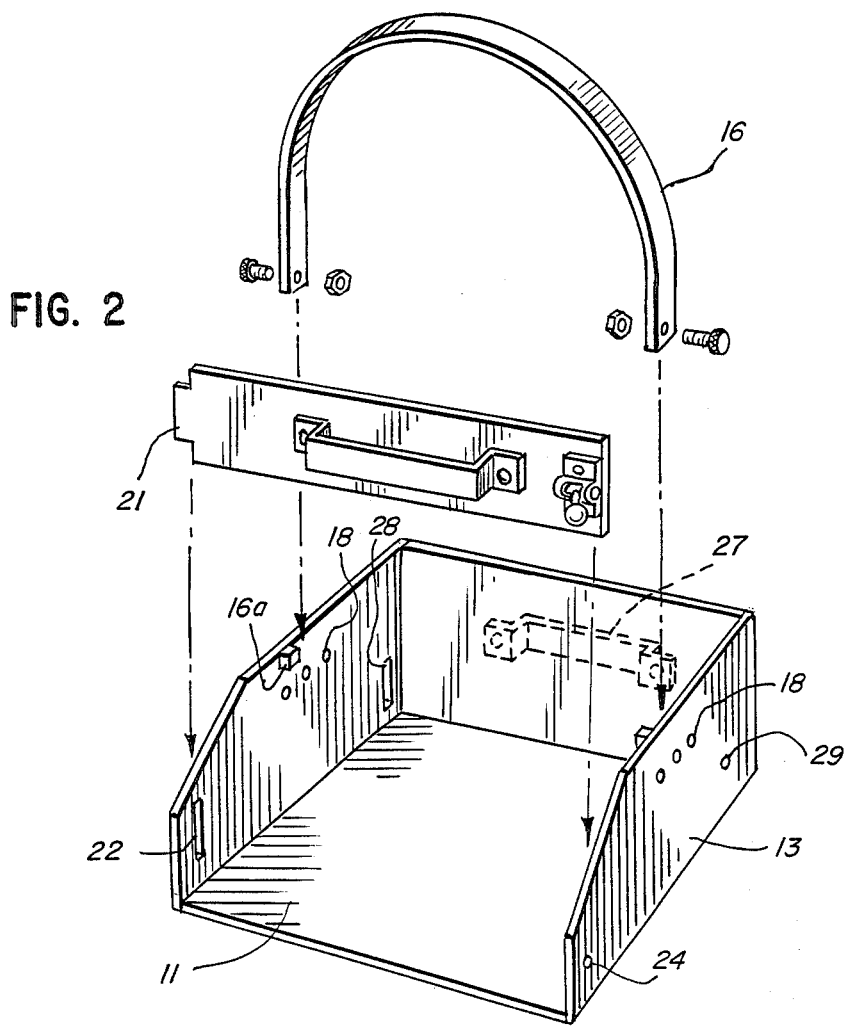
FIG. 2 is an exploded top perspective view of the scoop of the invention with the front gate removed.

Referring now to the drawing in detail, and more particularly to FIGS. 1 and 2, the reference numeral 10 represents a garden scoop which can be made from plastic material, sheet metal, or aluminum. The garden scoop 10 includes rectangular flat bottom 11 bounded on its rear edge by an upstanding vertical back wall 12 and bounded on opposite side edges by side walls 13 and 14. Detachably mounted front gate 15 is placed between side walls 13 and 14 and adjacent bottom 11. Handle 16 can be mounted adjacent to the top edge of side walls 13 and 14 by bolt 17 engaged in any of the multiple laterally spaced apertures 18. The handle loop 16 extends across the open top of the scoop. Laterally spaced apertures 18 are bolt holes placed about one inch below the top edge of walls 13 and 14. The aperatures are placed about midway or forward of the midway point in the length of walls 13 and 14. Blocking means 16a are located on the inside of side walls 13 and 14, forwardly, slightly above and adjacent multiple aperatures 18. Blocking means 16a provide support for handle 16 so when a load is carried in the scoop, particularly the back of the scoop, handle 16 is blocked by means 16a from pivoting towards front gate 15 or the forward end of the scoop. Likewise, when pivoting in the opposite direction away from the front gate, handle 16 is prevented from contacting flat bottom 11 by means 16a which engage the end portions 16b of handle 16.

Front gate 15, has two ends, 19 and 20. End 19 may be attached to side wall 14 by pivoting means, particularly tongue 21 which is inserted through slot 22 in side wall 14. At end 20 of detachably mounted gate 15 are latching means 23 which extend through aperture 24 of side wall 13. Any means for securing gate 15 to scoop 10 so that it is detachable mounted is suitable.

Front gate 15 supports handle 25 secured by bolts 26 to the outside surface of the gate.

Vertical back wall 12 supports handle 27. Fixed handle 27 is horizontally mounted on the outside of upstanding back wall 12 by bolts 26a and is used for carrying and dumping objects from scoop 10. Both externally mounted handles 25 and 27 facilitate lifting and carrying heavy loads in scoop 10 with two hands.

Front gate 15 may be removed and stored inside the scoop 10 and adjacent back wall 12. Tongue 21 of front gate 15 may be inserted in slot 28 in side wall 14. Latching means 23 may be inserted through operative 29 to secure front gate adjacent rear wall 12 for storage so the scoop may be used as a shovel to scoop dirt or in a manner where materials may be pushed or swept into the front opening of the scoop.

In operative use, it is now evident that front gate 15 may be removed and material scooped or placed into garden scoop 10. Handle 16 may be mounted in any of the laterally spaced apertures 18 adjacent the top edge of the side walls 13 and 14. By moving handle 16 backwards or forwards from the center of the scoop, more support for the weight carried may be obtained. Further, gate 15 may be stored in scoop 10 adjacent back wall 12 and opposing side walls 13 and 14 when scoop 10 is in use and to avoid misplacing it. Handles 25 and 27 provide means for carrying heavy loads in scoop 10.

While preferred embodiments have been shown and described herein, it is obvious that other and further modifications, such as placement of the handles 16 and 25 and securing means for front gate 15 may be made without departing from the spirit and scope from the present invention as is defined by the appended claims.

What is claimed is:

1. A garden scoop for removing trash or carrying objects comprising a flat rectangular bottom, an upstanding back wall, opposite side walls having a sloping front opposite the back wall, and a front gate between the side walls and adjacent the bottom, said front gate being detachably mounted for facile removal and replacement and a handle mounted on said side walls adapted for carrying said garden scoop.

2. A garden scoop according to claim 1 wherein said opposite side walls include multiple apertures laterally spaced adjacent the top edge of the side walls for placement of means to secure a handle for carrying said garden scoop.

3. A garden scoop according to claim 2 wherein said opposite side walls contain means to prevent said handle from pivoting towards said fornt gate and to prevent said handle from resting against said rectangular bottom.

4. A garden scoop according to claim 3 wherein said means is a block attached to the inside of said side walls forwardly and adjacent said multiple aperatures.

5. A garden scoop according to claim 1 wherein a fixed handle is horizontally mounted on the back side of said upstanding back wall for carrying said garden scoop.

6. A garden scoop according to claim 1 wherein said front gate has two ends detachably mounted on said side walls, one end mounted by pivoting means and the other end mounted by latching means.

7. A garden scoop according to claim 1 wherein a handle is horizontally mounted on the front of said gate.

8. A garden scoop according to claim 1 wherein said front gate may be removed and stored inside said scoop adjacent said back wall.

* * * * *